(12) United States Patent
Makino

(10) Patent No.: US 8,247,759 B2
(45) Date of Patent: Aug. 21, 2012

(54) PROJECTOR APPARATUS HAVING A LIGHT LEAKAGE SECTION

(75) Inventor: Wataru Makino, Shizuoka (JP)

(73) Assignee: Sony Corporation, Tokyo (JP)

( * ) Notice: Subject to any disclaimer, the term of this patent is extended or adjusted under 35 U.S.C. 154(b) by 414 days.

(21) Appl. No.: 12/650,026

(22) Filed: Dec. 30, 2009

(65) Prior Publication Data

US 2010/0188643 A1   Jul. 29, 2010

(30) Foreign Application Priority Data

Jan. 27, 2009  (JP) ................................. 2009-015232

(51) Int. Cl.
   *H01J 5/02* (2006.01)
(52) U.S. Cl. .......................................... 250/239; 353/88
(58) Field of Classification Search .................. 250/239, 250/216, 208.1, 205; 353/88, 119, 75
   See application file for complete search history.

(56) References Cited

U.S. PATENT DOCUMENTS 3,894,798 A * 7/1975 Wolf .............................. 353/122

FOREIGN PATENT DOCUMENTS

| JP | 3-94888 | 4/1991 |
|---|---|---|
| JP | 5-8556 | 1/1993 |
| JP | 2001-174910 | 6/2001 |
| JP | 2008-217008 | 9/2008 |
| TW | 245454 | 10/2004 |

OTHER PUBLICATIONS

Office Action issued Mar. 17, 2011, in Chinese Patent Application No. 201010103977.8 (with English-language translation).

* cited by examiner

*Primary Examiner* — Que T Le
(74) *Attorney, Agent, or Firm* — Oblon, Spivak, McClelland, Maier & Neustadt, L.L.P.

(57) ABSTRACT

A projector apparatus includes: a case; a light source which is provided in the case and emits light by supply of power; an opening provided in the case; an image projection unit that generates image projection light from light of the light source and emits the image projection light through the opening in order to project an image onto a screen; a shutter which is moved to a block position at which the opening provided in the case is blocked or to an open position at which the opening is opened; and a light leakage section which provides notification that the power is being supplied to the light source by allowing some light beams of the light source or some light beams of the image projection unit to leak to the outside of the case in a state where the shutter is located at the block position.

15 Claims, 13 Drawing Sheets

PROJECTOR APPARATUS HAVING A LIGHT LEAKAGE SECTION

BACKGROUND OF THE INVENTION

1. Field of the Invention

The present invention relates to a projector apparatus.

2. Description of the Related Art

There is a projector apparatus including a case, a light source provided in the case, an opening provided in the case, and an image projection unit that generates image projection light using the light of the light source and emits the image projection light through the opening in order to project an image onto a screen.

When using such a projector apparatus, the user may want to temporarily stop the projection of an image to the screen for convenience in use.

For this reason, various projector apparatuses have been proposed in which a shutter that opens or closes an opening is provided (refer to JP-A-3-94888, JP-A-5-8556, and JP-A-2001-174910).

SUMMARY OF THE INVENTION

According to such apparatuses, the projection of an image to a screen may be temporarily stopped by blocking the opening with the shutter.

In this state, no display is performed on the screen.

Accordingly, if the user forgets having closed the shutter, the user may think erroneously that a power source of the projector apparatus is turned off and forget to turn off the power switch. Alternatively, the user may think erroneously that the projector apparatus is out of order.

Thus, it is desirable to provide a projector apparatus which is advantageous in improving usability since it is possible to reliably see that the projector apparatus is in the operating state even if a shutter is closed.

According to an embodiment of the present invention, there is provided a projector apparatus including: a case; a light source which is provided in the case and emits light by supply of power; an opening provided in the case; an image projection unit that generates image projection light from light of the light source and emits the image projection light through the opening in order to project an image onto a screen; a shutter which is moved to a block position at which the opening provided in the case is blocked or to an open position at which the opening is opened; and a light leakage section which provides notification that the power is being supplied to the light source by allowing some light beams of the light source or some light beams of the image projection unit to leak to the outside of the case in a state where the shutter is located at the block position.

According to the embodiment of the present invention, while the projector apparatus is being used, some light beams of the light source or some light beams of the image projection unit leak from the light leakage section to the outside of the case in a state where the shutter is located at the block position. Accordingly, the user can clearly see that the projector apparatus is in the operating state.

DESCRIPTION OF THE PREFERRED EMBODIMENTS

First Embodiment

Next, a first embodiment of the present invention will be described with reference to FIGS. 1 to 7.

As shown in FIGS. 1 to 5, a projector apparatus 10 includes a case 12 and a light leakage section 60A.

The case 12 has a height, a length larger than the height, and a width larger than the length and is formed in a flat rectangular plate shape.

The case 12 includes a front wall 12A, a back wall 12B, a top wall 12C, a bottom wall 12D, and left and right side walls 12E and 12F. Moreover, in the present embodiment, when the projector apparatus 10 is seen from a screen side, the screen side is the front side and the opposite side is the back side. The left and right sides are when the projector apparatus 10 is seen from the front side.

Figure 1:
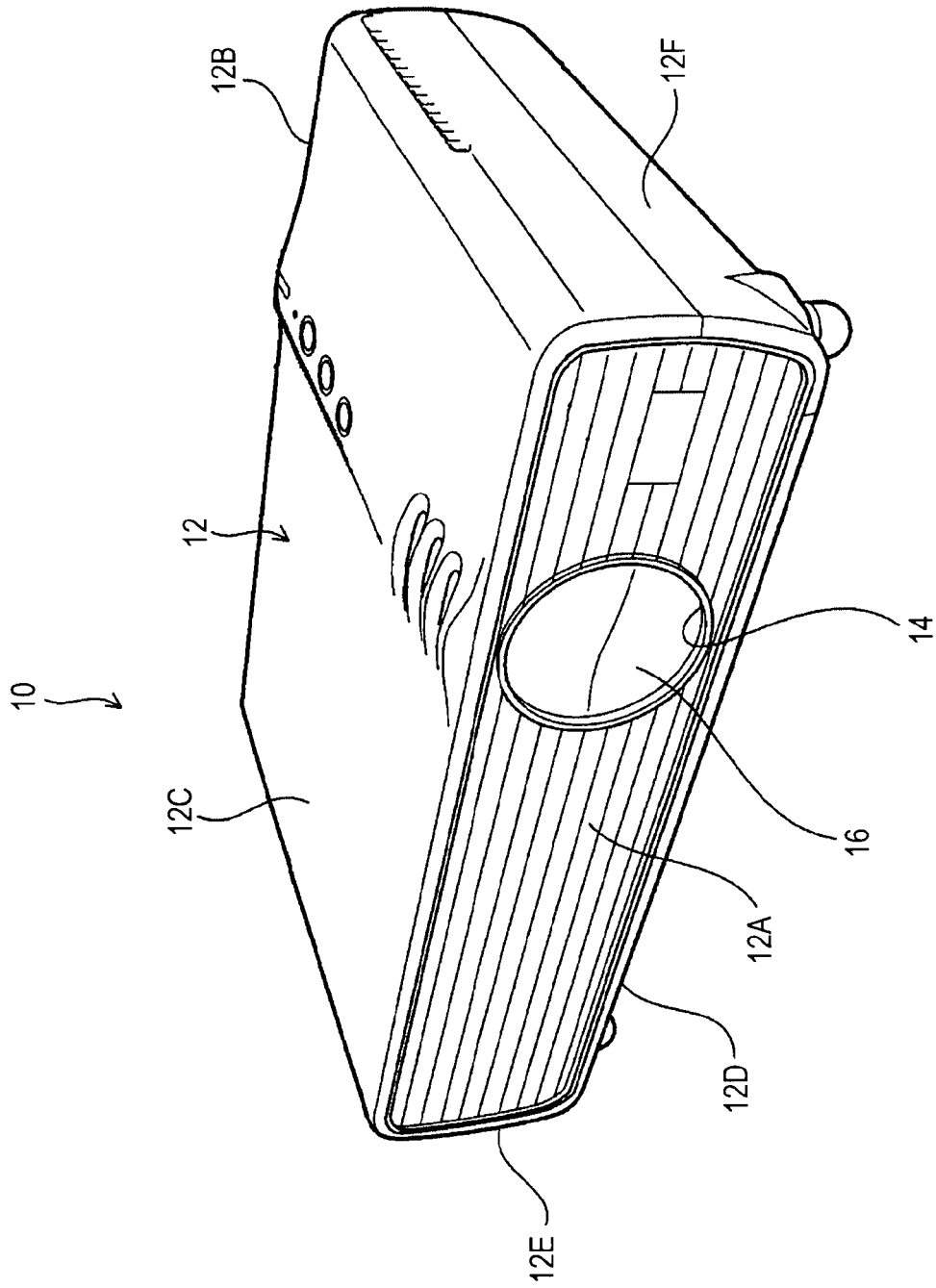
FIG. 1 is a perspective view showing a projector apparatus according to a first embodiment when seen from the front side.
Figure 3:
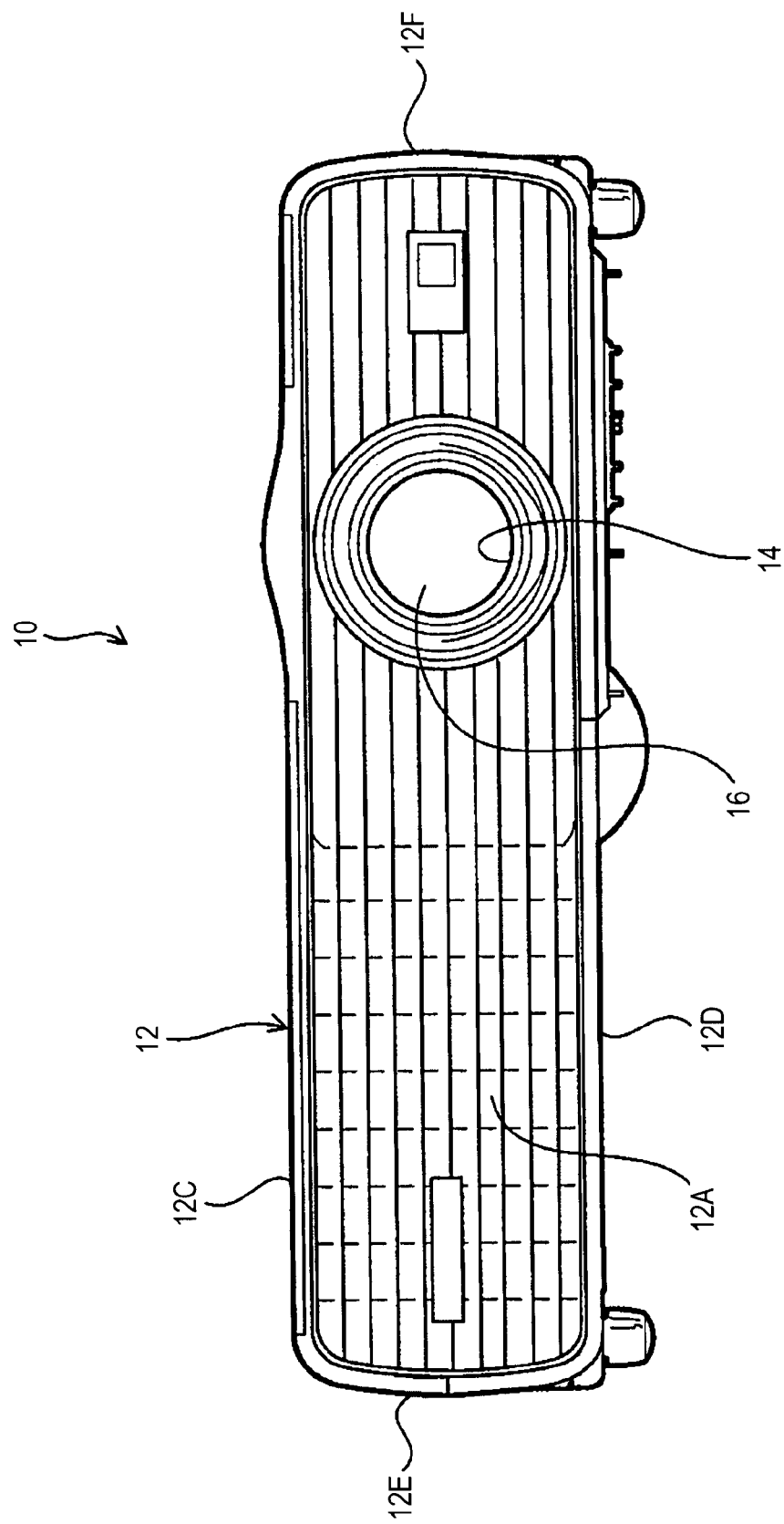
FIG. 3 is a front view showing the projector apparatus according to the first embodiment.

As shown in FIGS. 1 and 3, an opening 14 is provided in the front wall 12A so as to be positioned close to the right side wall 12F from the middle in the width direction of the front wall 12A.

A shutter 16, which will be described later, is provided in the case 12 so as to be positioned behind the opening 14, and a projection optical system 56 (refer to FIG. 7) is provided behind the shutter 16.

The shutter 16 is moved to the block position at which the opening 14 is blocked or to the open position at which the opening 14 is opened.

As the structure of the shutter 16, various known structures, such as a structure using one blade or a structure using a plurality of blades, may be adopted.

Figure 4:
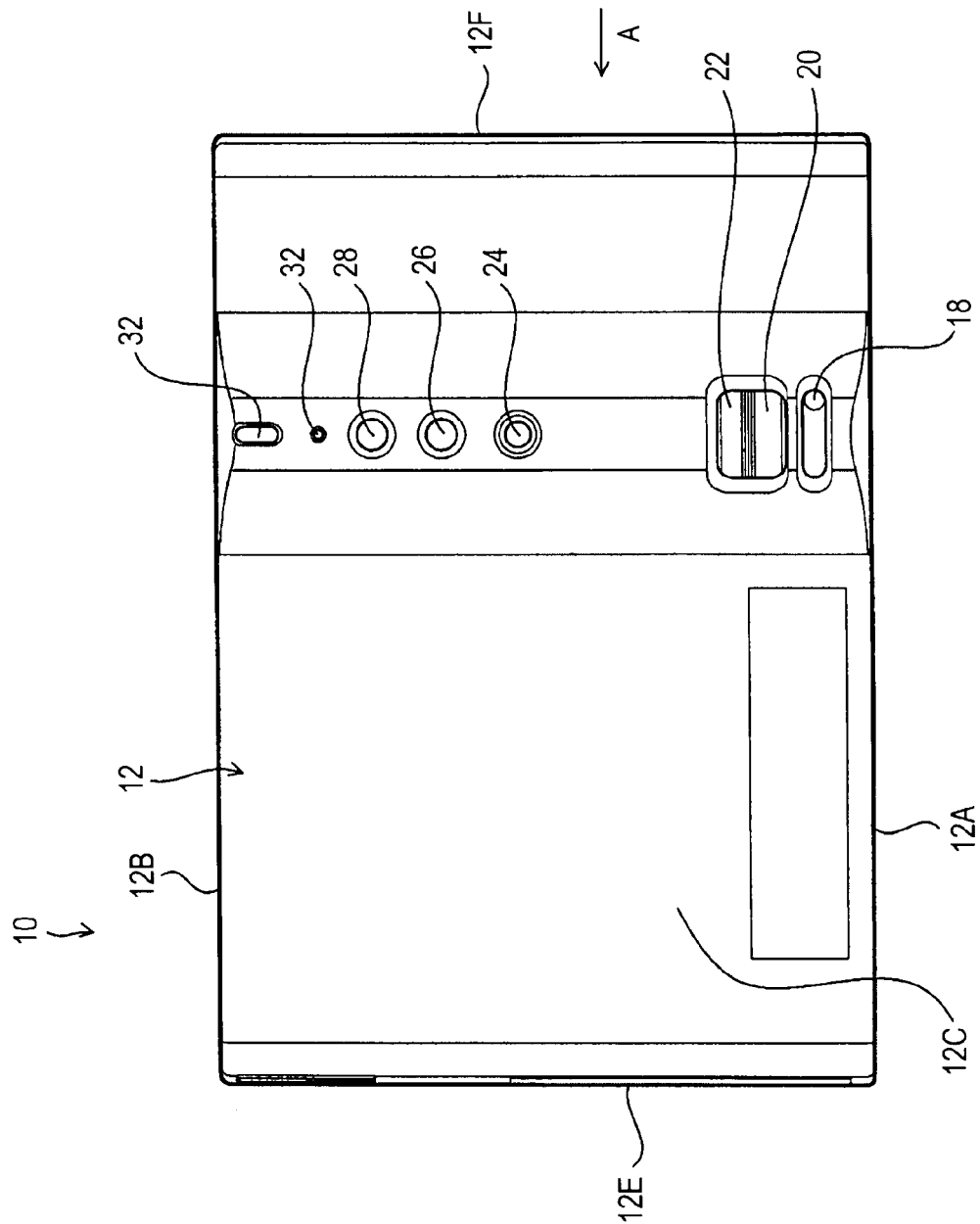
FIG. 4 is a plan view showing the projector apparatus according to the first embodiment.
Figure 5:
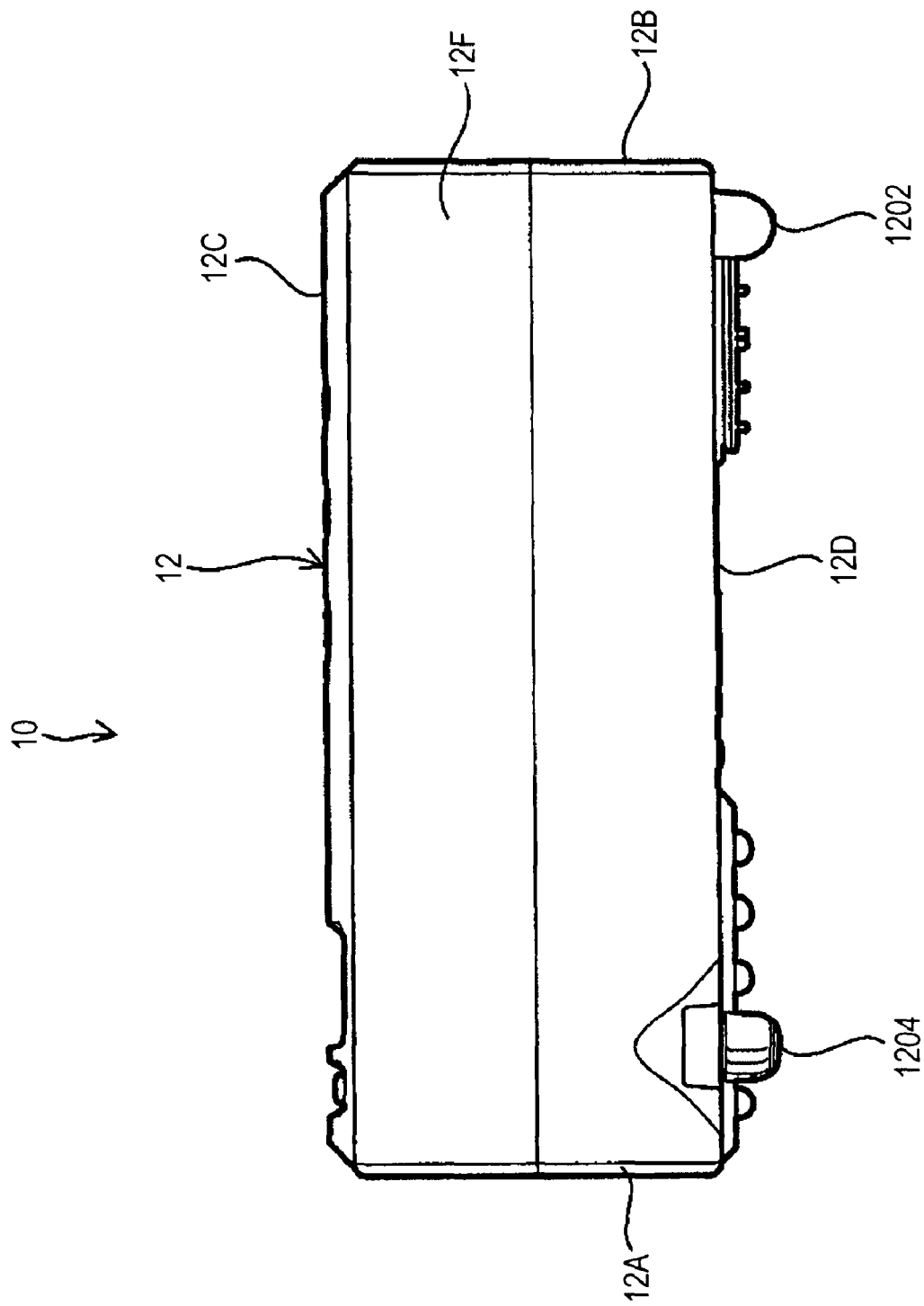
FIG. 5 is a view showing a portion indicated by the arrow A in FIG. 4.

As shown in FIG. 4, in a place of the top wall 12C which is close to the right side wall 12F from the middle in the width direction of the top wall 12C, a shutter operating member 18, a focus ring 20, and a zoom ring 22 are provided in this order backward from the front side and in a line with distances therebetween.

Moreover, behind the focus ring 22, an operation switch 24, a menu switch 26, an input selection switch 28, a lamp/cover indicator 30, and a power switch 32 are provided in this order backward from the front side and in a line with distances therebetween.

The shutter operating member 18 is operated to open and close the shutter 16 manually.

The focus ring 20 is rotation-operated to perform focus adjustment of an image, which is projected on the screen, by adjusting the focal distance of the projection optical system 56.

The zoom ring 22 is rotation-operated to perform magnification adjustment of an image, which is projected on the screen, by adjusting the magnification of the projection optical system 56.

The operation switch 24 is operated to move a cursor displayed on a menu screen projected onto the screen.

The menu switch 26 is operated to display the menu screen on the screen or to stop displaying the menu screen.

The input selection switch 28 is operated to perform switching among a plurality of image signals input to the projector apparatus 10.

The lamp/cover indicator 30 blinks in order to indicate that the cover of a light source (refer to FIG. 7) to be described later is open, the light source is to be replaced, or that the temperature of the light source is higher than a predetermined temperature.

The power switch 32 is for performing ON and OFF of the power source of the projector apparatus 10. When power is ON, the power switch 32 itself is lit with green light, for example.

Figure 2:
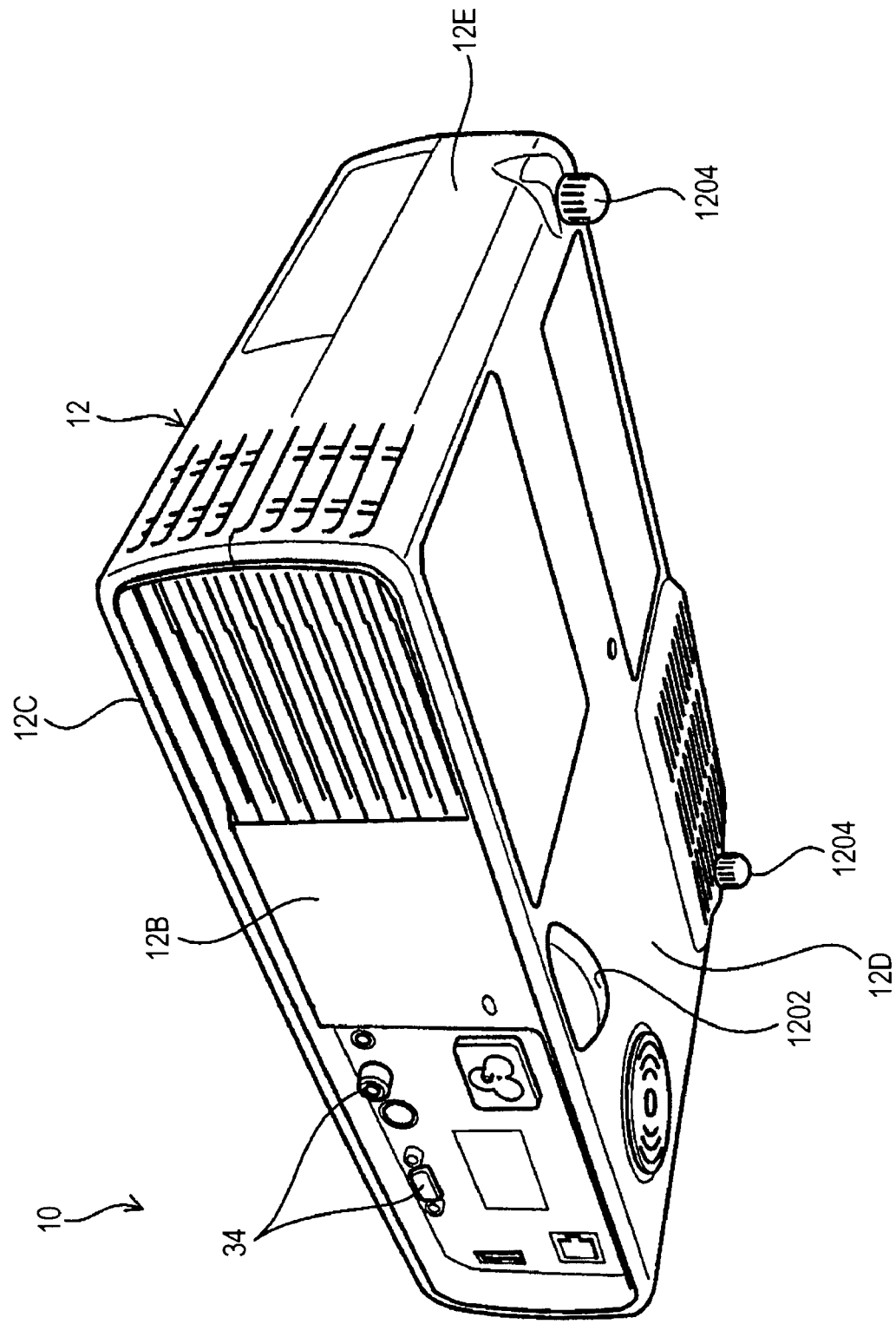
FIG. 2 is a perspective view showing the projector apparatus according to the first embodiment when seen from the back side.

In FIG. 2, reference numeral 1202 indicates a leg provided in the middle in the width direction at the rear side of the bottom wall 12D in order to place the projector apparatus 10 on the mounting surface.

In addition, reference numeral 1204 indicates two adjusting screws for moving the projector apparatus 10 up and down in a state where the projector apparatus 10 is placed on the mounting surface. The position of an image projected on the screen is adjusted by changing the optical axis of the projection optical system 56 up and down by adjusting the adjusting screws 1204.

Moreover, reference numeral 34 indicates an external signal input connector through which an image signal supplied from an external device, such as a personal computer, is input.

Figure 6:
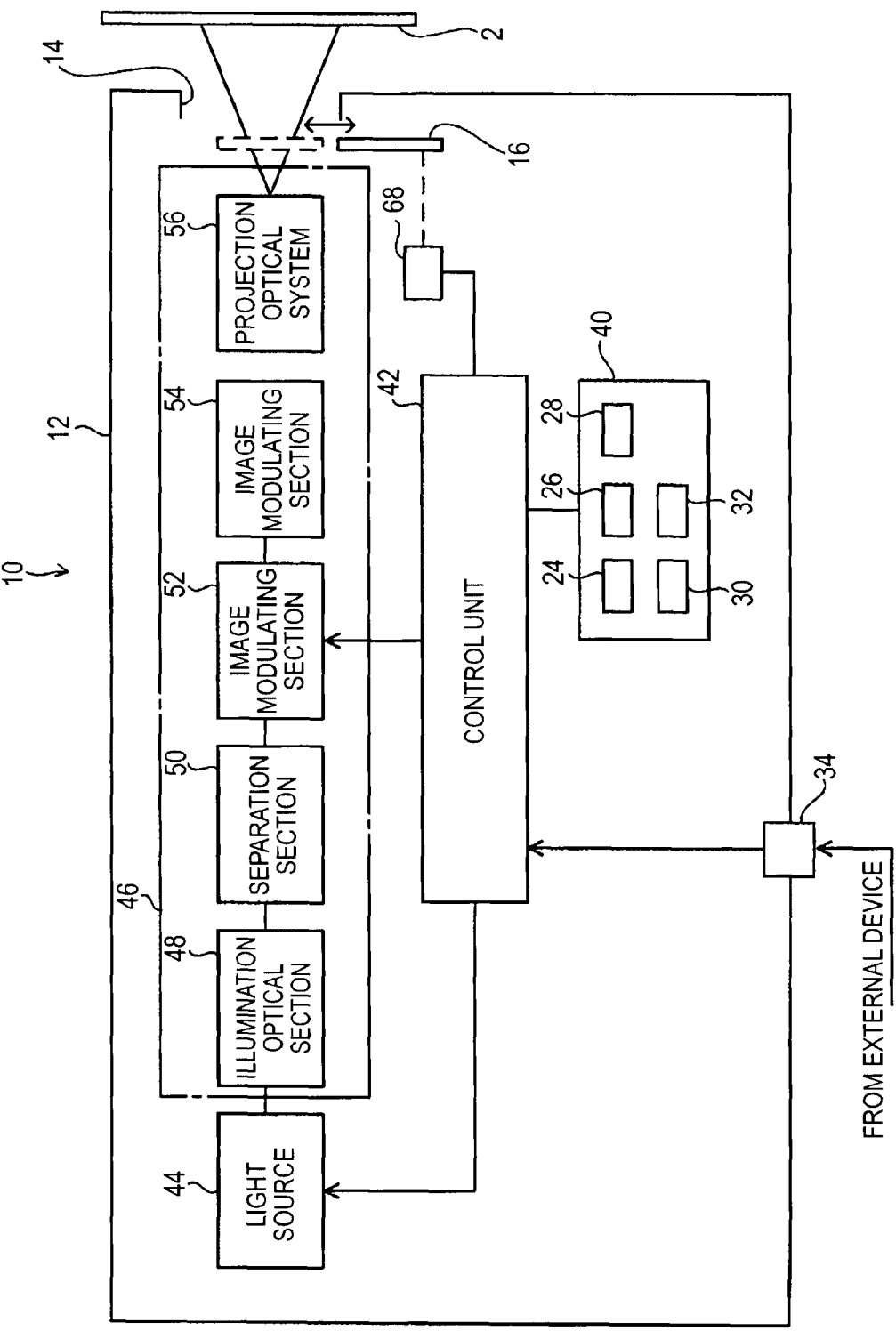
FIG. 6 is a block diagram showing the configuration of the projector apparatus according to the first embodiment.

As shown in FIG. 6, the projector apparatus 10 further includes an operating unit 40, a control unit 42, a light source 44, and an image projection unit 46.

The operating unit 40 includes the operation switch 24, the menu switch 26, the input selection switch 28, the lamp/cover indicator 30, and the power switch 32.

The control unit 42 controls the light source 44 and the image projection unit 46 on the basis of an operation of the operating section 40.

The control unit 42 is formed by a microcomputer in which a CPU, a ROM for storing a control program and the like, a RAM for providing a working area, an interface section for interface with a peripheral circuit, and the like are connected to each other by a bus, for example. The control unit 42 operates when the CPU executes a control program.

Specifically, the control unit 42 generates image information of three colors of red, green, and blue by performing necessary signal processing on an image signal, which is supplied from the external signal input connector 34, and supplies the image information to the image projection unit 46, thereby displaying an image on a screen 2.

In addition, the control unit 42 displays an image on the screen 2 by supplying the image information of a menu screen to the image projection unit 46.

Next, the light source 44 and the image projection unit 46 will be described.

Figure 7:
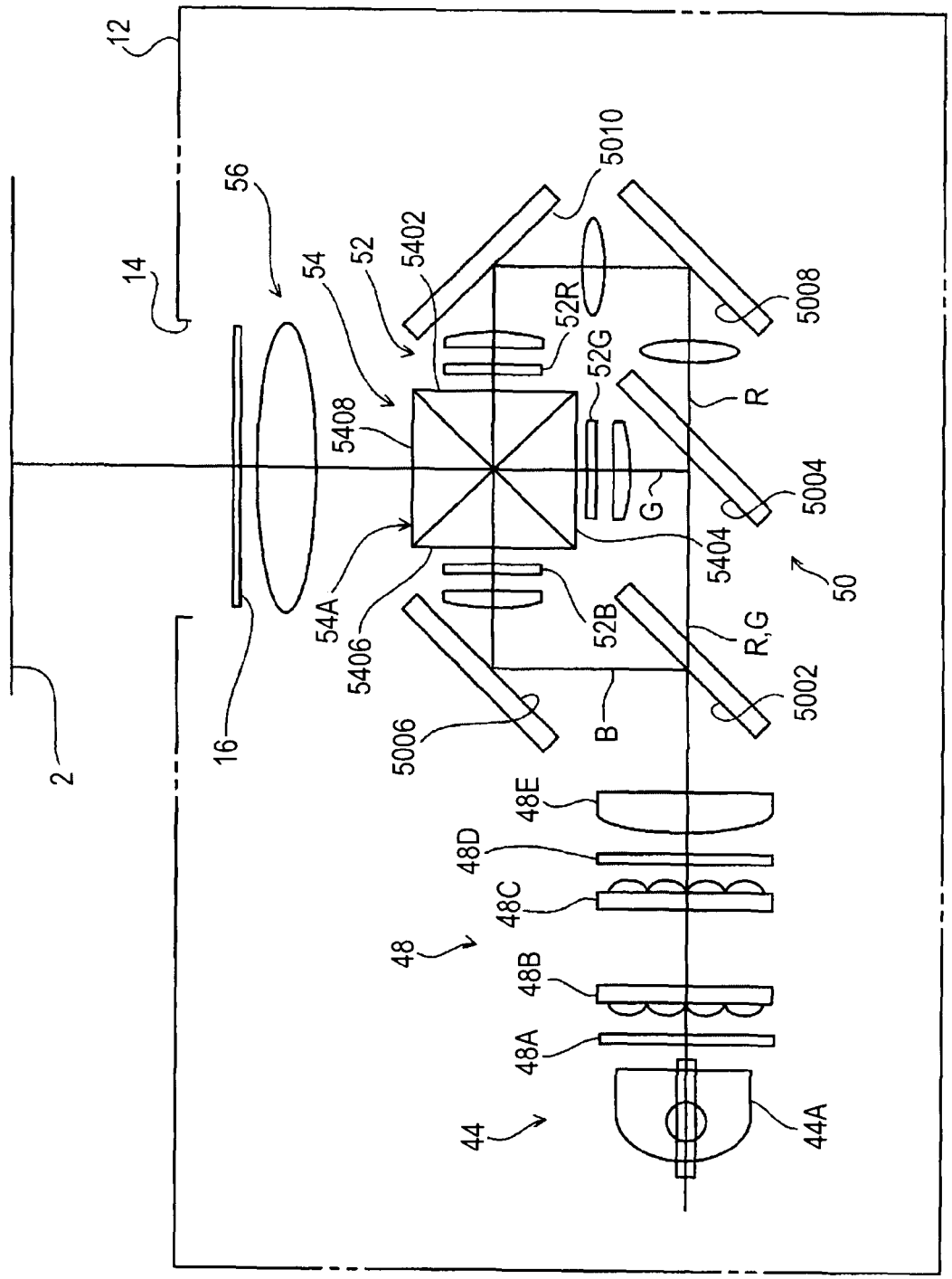
FIG. 7 is a view showing the configuration of an optical system of the projector apparatus according to the first embodiment.

As shown in FIG. 7, the light source 44 includes a lamp 44A and a power supply section (not shown).

The light source 44 is disposed in the case 12 and emits light by an operation of the power switch 32.

The lamp 44A is driven by power supplied from the power supply section and emits light. A white light source which illuminates light having a spectrum in a visible range is used as the lamp 44A.

As the white light source, it is possible to use various known light sources, for example, a light source with a continuous spectrum, such as a xenon lamp, a high-pressure mercury lamp, and a metal halide lamp, or a light source with a discrete spectrum, such as an LED light source.

For example, the lamp 44A has a parabolic reflector so that light beams emitted from the lamp 44A become approximately parallel beams.

The image projection unit 46 projects an image on the screen 2 by generating image projection light from the light of the light source 44 and emitting the image projection light through the opening 14.

As shown in FIG. 6, the image projection unit 46 includes an illumination optical section 48, a separation section 50, an image modulating section 52, an image mixing section 54, and the projection optical system 56, and the image projection unit 46 is disposed in the case 12.

As shown in FIG. 7, the illumination optical section 48 cuts some light beams emitted from the light source 44 and guides light beams to the separation section 50 with the illuminance of the light beams uniform.

In the present embodiment, the illumination optical section 48 includes an infrared and ultraviolet cut filter 48A for cutting an ultraviolet ray and an infrared ray, two fly-eye lenses 48B and 48C for making the illuminance of light uniform, a polarization conversion element 48D, a condenser lens 48E, and the like.

In addition, heating or deterioration of various optical components which form the separation section 50, the image modulating section 52, the image mixing section 54, and the projection optical system 56 can be prevented by cutting an ultraviolet ray and an infrared ray included in the light emitted from the light source 44 using the infrared and ultraviolet cut filter 48A.

The separation section 50 separates the light (white light), which has been guided from the illumination optical section 48 and the illuminance of which has been made uniform, into light beams of three colors of red (R), green (G), and blue (B) colors.

The separation section 50 includes a plurality of dichroic mirrors, for example.

Specifically, in the present embodiment, the separation section 50 includes first and second dichroic mirrors 5002 and 5004 and first to third mirrors 5006, 5008, and 5010.

The first dichroic mirror 5002 is configured to transmit light beams of red (R) and green (G) colors among light beams guided from the illumination optical section 48 and to reflect a light beam of a blue (B) color.

The second dichroic mirror 5004 is configured to transmit a light beam of a red (R) color among the light beams of red (R) and green (G) colors, which have been transmitted through the first dichroic mirror 5002, and to reflect a light beam of a green (G) color.

Accordingly, light beams guided from the illumination optical section 48 to the first dichroic mirror 5002 are separated into two groups of light beams, that is, light beams of a blue (B) color and light beams of red (R) and green (G) colors by the first dichroic mirror 5002.

The light beam of a blue (B) color separated by the first dichroic mirror 5002 is reflected by the first mirror 5006.

Among the light beams of red (R) and green (G) colors separated by the first dichroic mirror 5002, the light beam of a green (G) color reaches the second dichroic mirror 5004.

Among the light beams of red (R) and green (G) colors separated by the first dichroic mirror 5002, the light beam of a red (R) color is transmitted through the second dichroic mirror 5004, reaches the third mirror 5010 through the second mirror 5008, and is reflected by the third mirror 5010.

The light beams of red (R), green (G), and blue (B) colors separated by the separation section 50 are emitted from the separation section 50 toward the image modulating section 52.

In addition, any component may be used as the separation section 50 as long as the component has a function of separating light (white light) guided from the illumination optical section 48 into three light beams of three colors of red (R), green (G), and blue (B) colors. It is a matter of course that various known structures may be adopted as the separation section 50.

The image modulating section 52 modulates three kinds of light beams of red (R), green (G), and blue (B) colors guided from the separation section 50 on the basis of the image information and supplies them to the image mixing section 54.

The image modulating section 52 has first to third image modulating elements 52R, 52G, and 52B corresponding to the three kinds of light beams of red (R), green (G), and blue (B) colors.

In the present embodiment, the first to third image modulating elements 52R, 52G, and 52B are formed by a transmissive liquid crystal display device (liquid crystal light valve).

The liquid crystal display device includes a liquid crystal display device body, which has two transparent substrates that seal a liquid crystal layer therebetween, and a polarizer provided in the liquid crystal display device body.

Each of the first to third image modulating elements 52R, 52G, and 52B has a display surface on which an image is displayed.

The first to third image modulating elements 52R, 52G, and 52B display images on the screen when image signals (driving signals) corresponding to the image information of three colors of red, green, and blue supplied from the control unit 42 are supplied.

The light beam of a red (R) color emitted from the separation section 50 to the image modulating section 52 is illuminated to the first image modulating element 52R, is modulated on the basis of the image information by passing through the first image modulating element 52R, and is then guided to the image mixing section 54.

The light beam of a green (G) color emitted from the separation section 50 to the image modulating section 52 is illuminated to the second image modulating element 52G, is modulated on the basis of the image information by passing through the second image modulating element 52G, and is then guided to the image mixing section 54.

The light beam of a blue (B) color emitted from the separation section 50 to the image modulating section 52 is illuminated to the third image modulating element 52B, is modulated on the basis of the image information by passing through the third image modulating element 52B, and is then guided to the image mixing section 54.

As the first to third image modulating elements 52R, 52G, and 52B, not only the transmissive liquid crystal display device but also a reflective liquid crystal display device may be used, or various known image display devices may be used. In addition, the image display section is not limited to the liquid crystal display device, and various known display devices which use various techniques may also be used.

The image mixing section 54 generates one image projection beam by mixing three beams of red (R), green (G), and blue (B) colors modulated by the image modulating section 52 and guides the image projection beam to the projection optical system 56.

In the present embodiment, the image mixing section 54 is formed by a cross prism 54A.

The cross prism 54A has three incidence surfaces 5402, 5404, and 5406 on which the light beams from the first to third image modulating elements 52R, 52G, and 52B are incident and which are perpendicular to each other.

In addition, the cross prism 54A has an emission surface 5408 from which the image projection beam generated by mixing the three beams of red (R), green (G), and blue (B) colors is emitted.

In addition, any component may be used as the image mixing section 54 as long as the component can generate one image projection beam by mixing three beams of red (R), green (G), and blue (B) colors. Thus, the image mixing section 54 is not limited to the cross prism 54A, and various known optical elements may also be used.

The projection optical system 56 includes a plurality of lenses so that the image projection beam guided from the image mixing section 54 is incident on the projection optical system 56 and is then projected onto the screen 2.

An objective lens 56A of the projection optical systems 56 is located at the forefront, and the objective lens 56A is disposed behind the shutter 16.

Some lenses of the projection optical system 56 including the objective lens 56A are supported by a lens barrel 58 so as to be movable in the optical axis direction.

Figure 8:
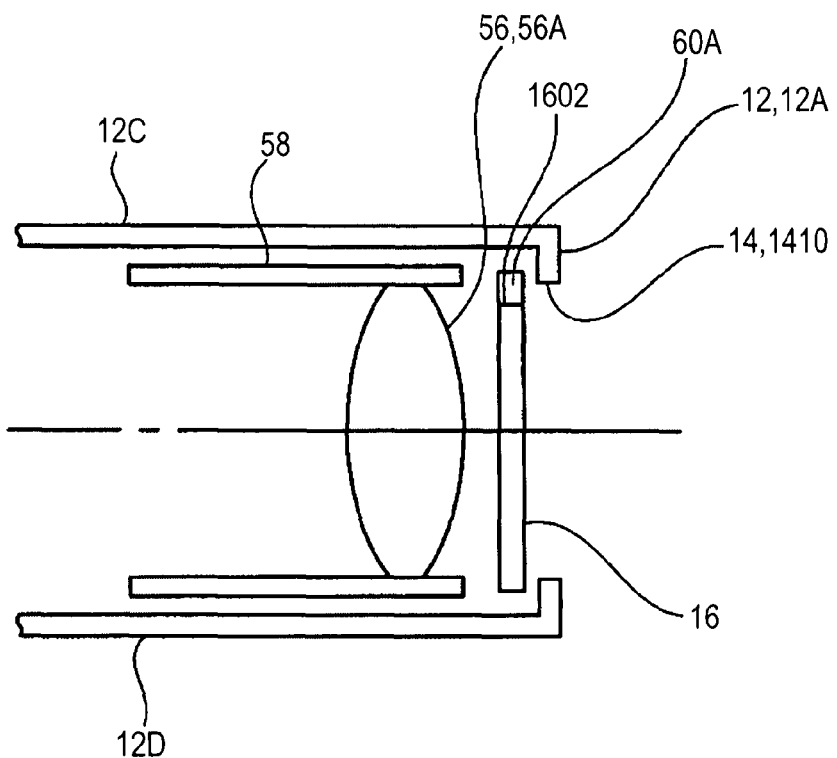
FIG. 8 is a sectional view showing a light leakage section of the projector apparatus according to the first embodiment.
Figure 9:
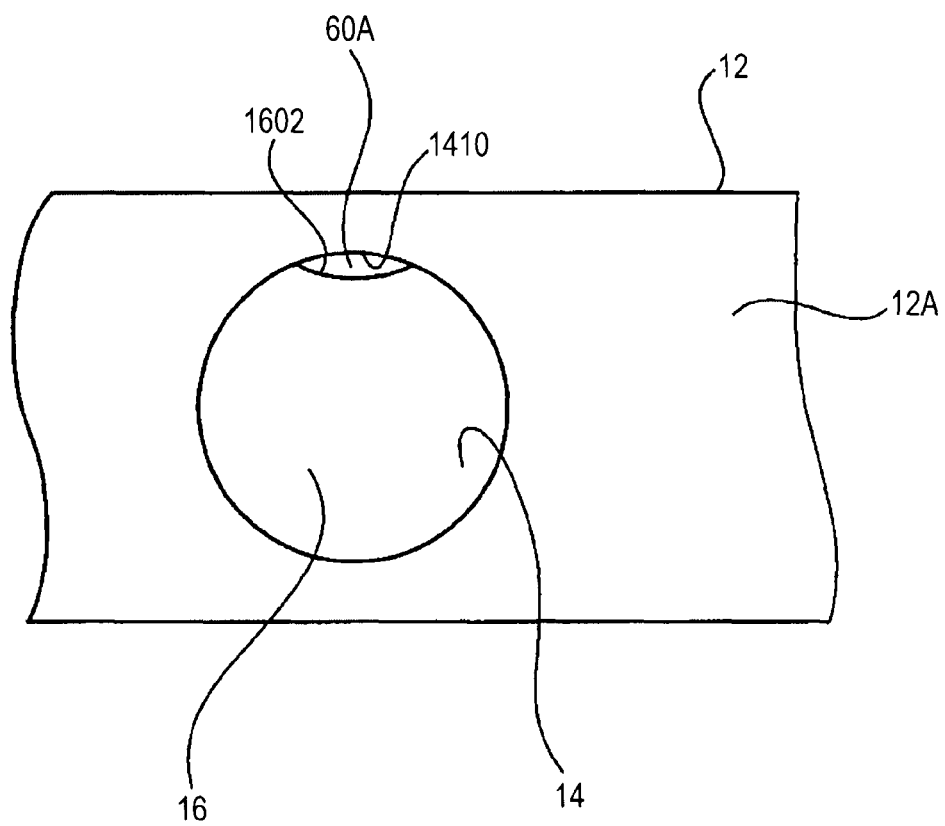
FIG. 9 is a front view for explaining the light leakage section of the projector apparatus according to the first embodiment.

The configuration of the light leakage section 60A is shown in FIGS. 8 and 9.

The light leakage section 60A allows some light beams emitted from the light source 44 or some light beams emitted from the image projection unit 46 to leak to the outside of the case 12 in a state where the shutter 16 is located at the block position. This is for providing notification that power is being supplied to the projector apparatus 10 including the light source 44.

In the present embodiment, the light leakage section 60A is formed as a gap, which is formed between the edge of the opening 14 and the shutter 16, and is provided so that some light beams emitted from the image projection unit 46 leak to the front of the front wall 12A of the case 12.

The light leakage section 60A is formed as a gap, which is formed by a notch 1602 formed in an outer peripheral portion of the shutter 16 and an edge 1410 of the opening 14.

According to the first embodiment, if the shutter 16 is located at the block position when the projector apparatus 10 projects an image onto the screen 2, the projection of an image to the screen 2 is temporarily stopped.

In this case, some light beams emitted from the image projection unit 46 leak from the light leakage section 60A to the front of the front wall 12A of the case 12 in a state where the shutter 16 is located at the block position.

However, since the amount of light leaking from the light leakage section 60A is small, a clear spot or a clear image is not formed on the screen 2.

In addition, the user can clearly see that the projector apparatus 10 is in the operating state by the light leaking from the light leakage section 60A.

Particularly, since light leaks to the front of the front wall 12A of the case 12, the user can see that the projector apparatus 10 is in the operating state very easily. That is, this is because an object is not placed ahead of the projector apparatus 10 where an image is projected even if objects are placed at the right or left side of the projector apparatus 10 or behind the projector apparatus 10.

Accordingly, the case does not occur in which the user mistakes a state where projection of an image to the screen 2 is temporarily stopped as a state where the power source of the projector apparatus 10 is turned off and forgets to turn off the power switch 32. Moreover, the case does not occur in which the user mistakes the state where projection of an image to the screen 2 is temporarily stopped as a state where the projector apparatus 10 is out of order.

In other words, it is possible to reliably see that the projector apparatus 10 is in the operating state even if the shutter 16 is at the block position, and this is advantageous in improving the usability of the projector apparatus 10.

In addition, since the light leakage section 60A has a very simple configuration, this is also advantageous in terms of cost reduction and miniaturization.

Second Embodiment

Next, a second embodiment will be described.

Figure 10:
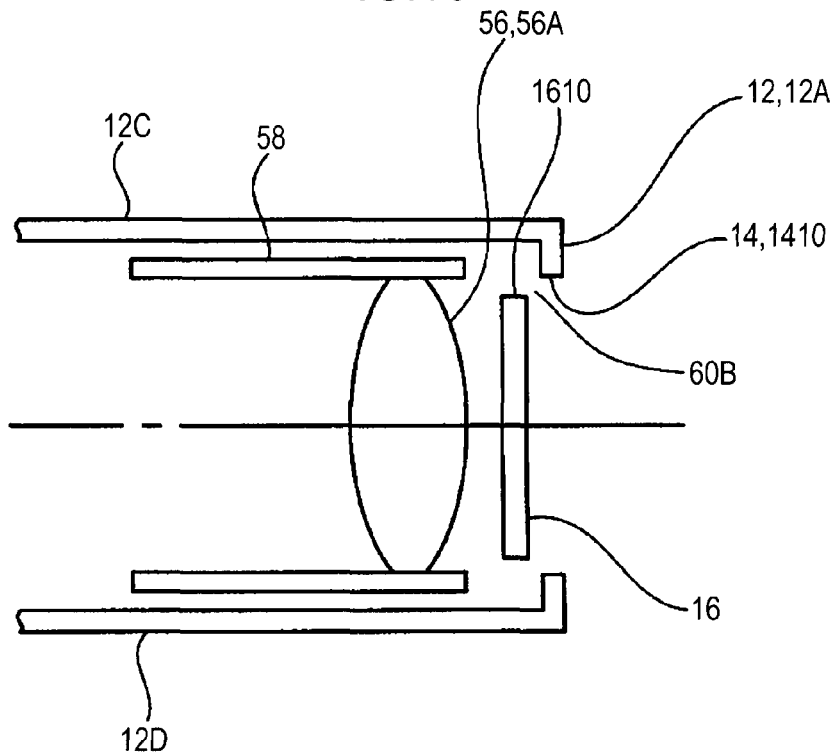
FIG. 10 is a sectional view for explaining the light leakage section of a projector apparatus according to a second embodiment.
Figure 11:
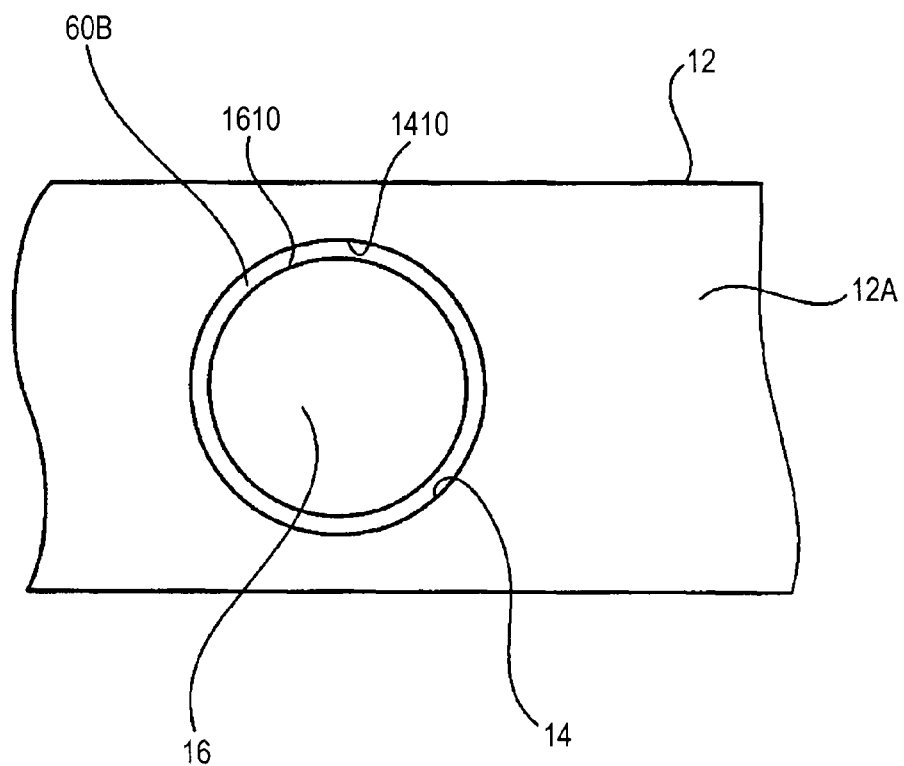
FIG. 11 is a front view for explaining a light leakage section of the projector apparatus according to the second embodiment.

As shown in FIGS. 10 and 11, the shutter 16 is formed to have a circular shape and an area smaller than the opening 14.

A light leakage section 60B is formed as a circular gap, which is formed between an outer peripheral portion 1610 of the shutter 16 and the edge 1410 of the opening 14, at the block position.

In the second embodiment, if the shutter 16 is located at the block position when the projector apparatus 10 projects an image onto the screen 2, the projection of an image to the screen 2 is temporarily stopped.

In this case, some light beams emitted from the image projection unit 46 leak from the light leakage section 60B to the front of the front wall 12A of the case 12 in a state where the shutter 16 is located at the block position.

Accordingly, also in the second embodiment, the same effects as in the first embodiment are obtained.

In addition, one or a plurality of through holes each of which has a sufficient diameter to transmit light therethrough may be provided in the outer peripheral portion of the shutter 16, such that the light leakage section 60B is formed by the through holes.

Alternatively, one or a plurality of through holes each of which has a sufficient diameter to transmit light therethrough may be provided in a place around the opening 14 of the front wall 12A of the case 12, such that the light leakage section 60B is formed by the through holes.

Third Embodiment

Next, a third embodiment will be described.

Figure 12:
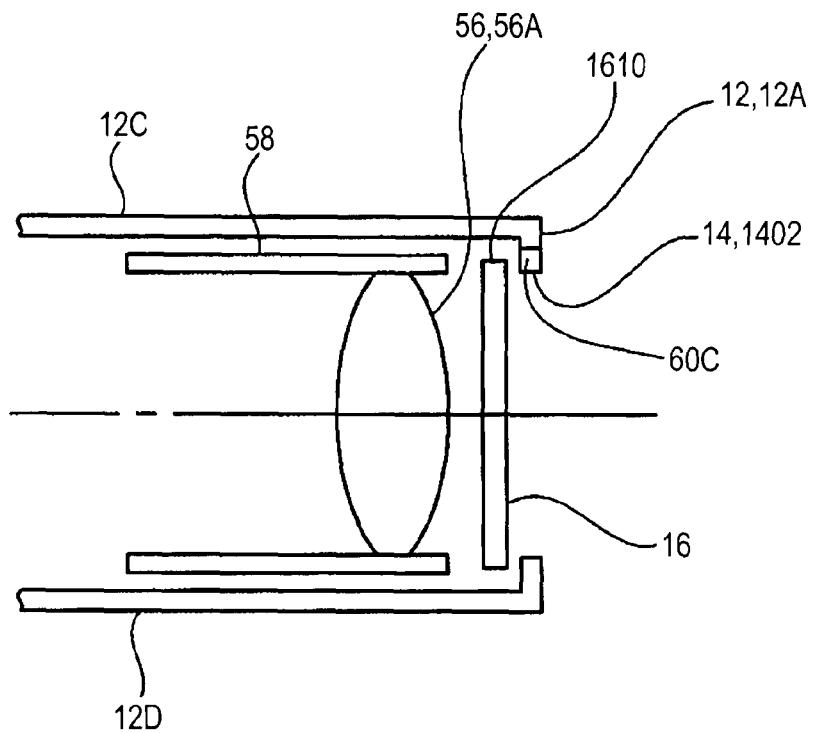
FIG. 12 is a sectional view for explaining a light leakage section of a projector apparatus according to a third embodiment.
Figure 13:
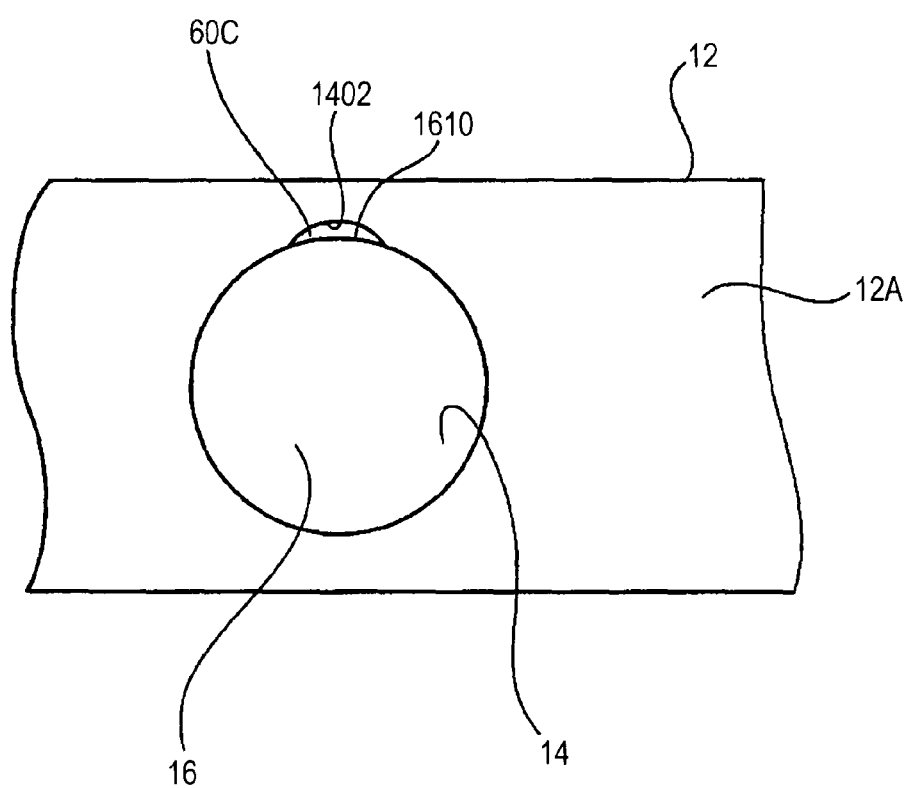
FIG. 13 is a front view for explaining the light leakage section of the projector apparatus according to the third embodiment.

As shown in FIGS. 12 and 13, a light leakage section 60C is formed as a gap, which is formed by a notch 1404 formed at the edge of the opening 14 and an outer peripheral portion 1604 of the shutter 16.

In the third embodiment, if the shutter 16 is located at the block position when the projector apparatus 10 projects an image onto the screen 2, the projection of an image to the screen 2 is temporarily stopped.

In this case, some light beams emitted from the image projection unit 46 leak from the light leakage section 60C to the front of the front wall 12A of the case 12 in a state where the shutter 16 is located at the block position.

Accordingly, also in the third embodiment, the same effects as in the first embodiment are obtained.

Fourth Embodiment

Next, a fourth embodiment will be described.

Figure 14:
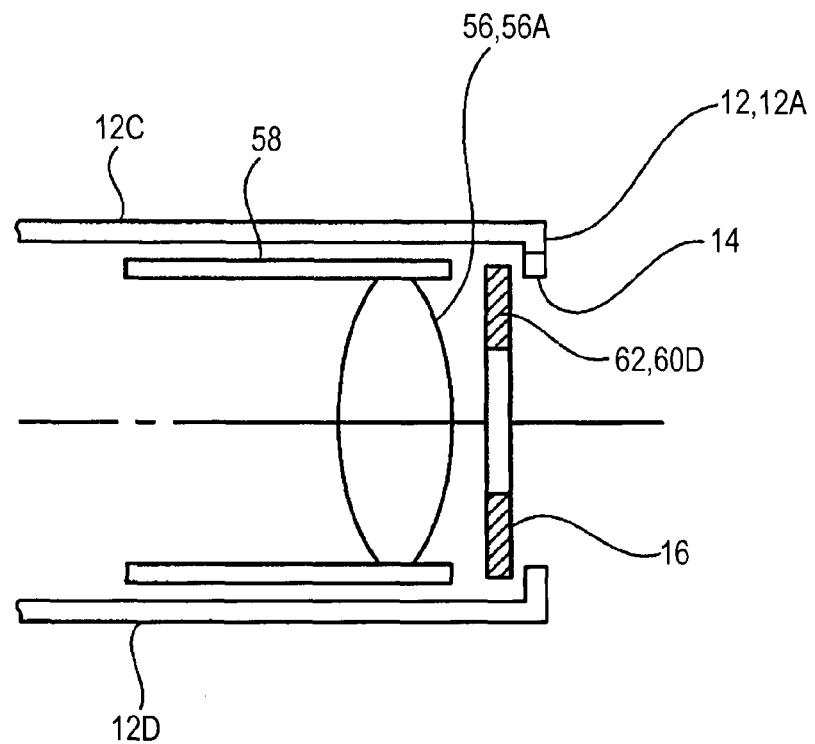
FIG. 14 is a sectional view for explaining a light leakage section of a projector apparatus according to a fourth embodiment.
Figure 15:
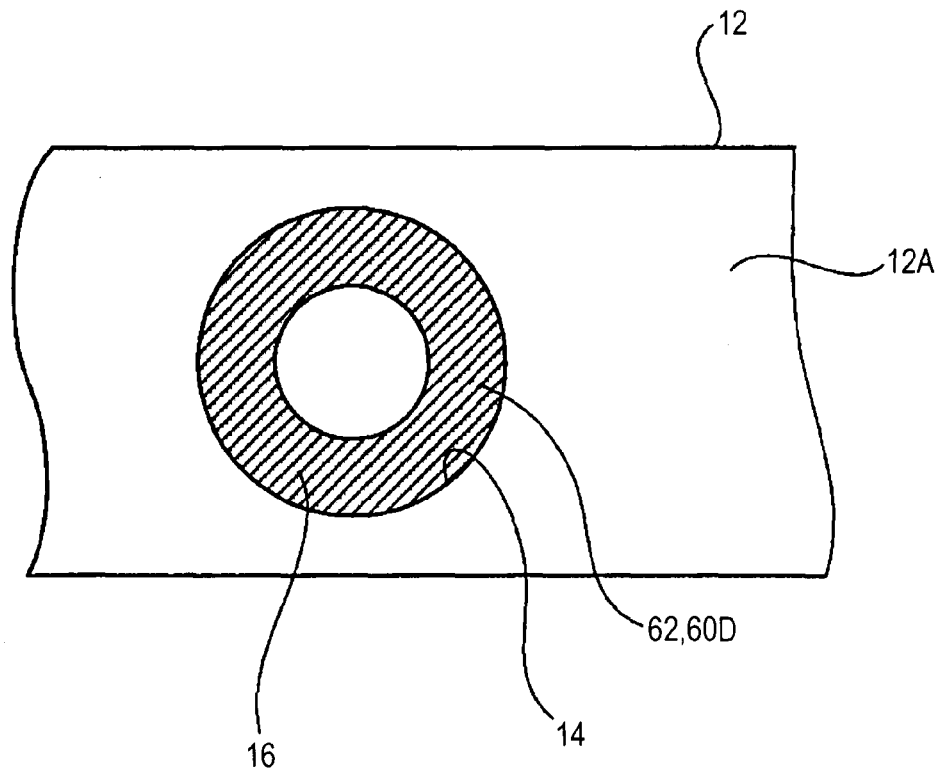
FIG. 15 is a front view for explaining the light leakage section of the projector apparatus according to the fourth embodiment.

As shown in FIGS. 14 and 15, a light transmission section 62, which is formed of a material that transmits light therethrough and through which some light beams emitted from the image projection unit 46 leak to the outside of the case 12 in a state where the shutter 16 is located at the block position, is provided in a part of the shutter 16.

In the present embodiment, the light transmission section 62 is formed in a circular shape along the outer periphery of the shutter 16.

A light leakage section 60D is formed by the light transmission section 62.

The light transmission section 62 may be formed of a translucent material, that is, a material which transmits light while reducing light. Various known materials may be used as the translucent material.

In the fourth embodiment, if the shutter 16 is located at the block position when the projector apparatus 10 projects an image onto the screen 2, the projection of an image to the screen 2 is temporarily stopped.

In this case, some light beams emitted from the image projection unit 46 leak from the light leakage section 60D to the front of the front wall 12A of the case 12 in a state where the shutter 16 is located at the block position.

Accordingly, also in the fourth embodiment, the same effects as in the first embodiment are obtained.

Fifth Embodiment

Next, a fifth embodiment will be described.

The fifth embodiment is different from the first to fourth embodiments in that a light leakage section 60 is provided in a shutter operating member 18.

As shown in FIGS. 16 to 19, the shutter operating member 18 for moving the shutter 16 between the block position and the open position is provided in the case 12.

A long hole 64 is formed in the top wall 12C of the case 12.

In the present embodiment, the shutter operating member 18 and the long hole 64 are provided in a place through which some light beams emitted from the image projection unit 46 are transmitted.

The shutter operating member 18 includes an inside portion 18A, which is located inside the case 12 and is connected to the shutter 16, and an operating portion 18B which protrudes from the inside portion 18A, passes through the long hole 64, and protrudes above the case 12.

A blocking plate portion 18C for blocking the long hole 64 at the block position is provided in the inside portion 18A.

A light transmission section 66, which is formed of a material that transmits light therethrough and through which some light beams emitted from the image projection unit 46 leak above the top wall 12C of the case 12, is provided in a place of the blocking plate portion 18C which blocks the long hole 64 at the block position.

A light leakage section 60E is formed by the light transmission section 66.

Similar to the light transmission section 62 in the fourth embodiment, the light transmission section 66 may be formed of a translucent material, that is, a material which transmits light while reducing light. Various known materials may be used as the translucent material.

In the present embodiment, other portions of the inside portion 18A excluding the blocking plate portion 18C are formed of a material of blocking light.

Figure 16:
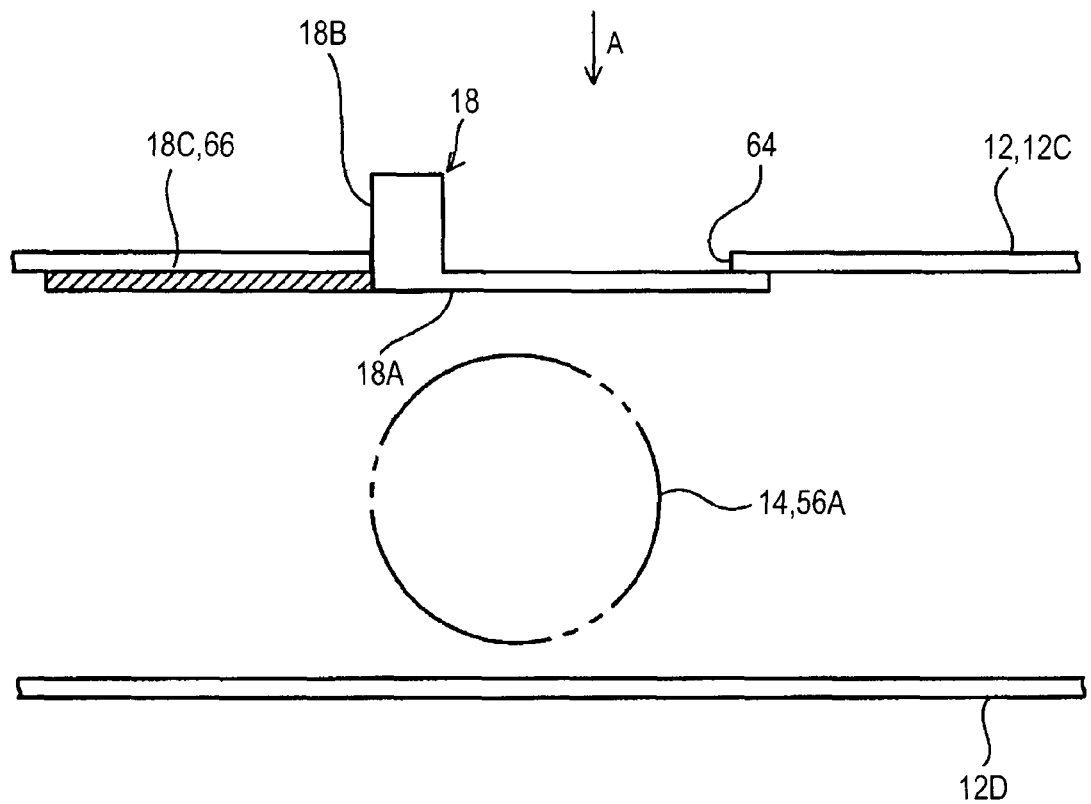
FIG. 16 is a sectional view showing a shutter operating member in a state where a shutter is located at the open position in a projector apparatus according to a fifth embodiment.
Figure 17:
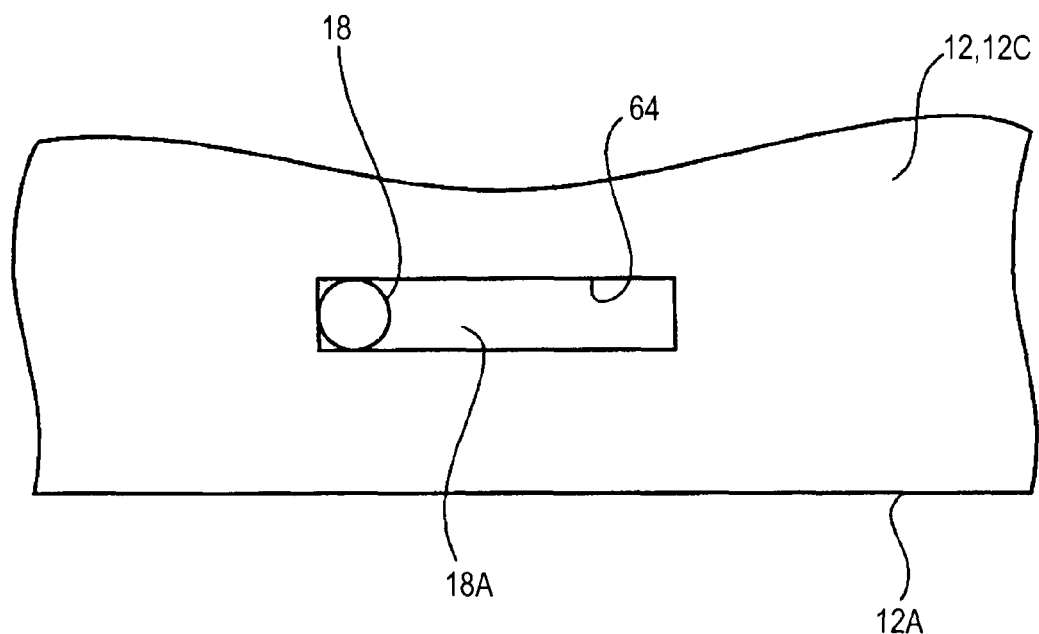
FIG. 17 is a view showing a portion indicated by the arrow A in FIG. 16.

In the fifth embodiment, if the shutter 16 is located at the open position as shown in FIGS. 16 and 17, the long hole 64 is blocked in a portion of the inside portion 18A excluding the blocking plate portion 18C and an image is projected onto the screen 2 by the projector apparatus 10 in this state.

Accordingly, in a state where the projector apparatus 10 is operating, light is blocked at the inside of the long hole 64 by the inside portion 18A.

Figure 18:
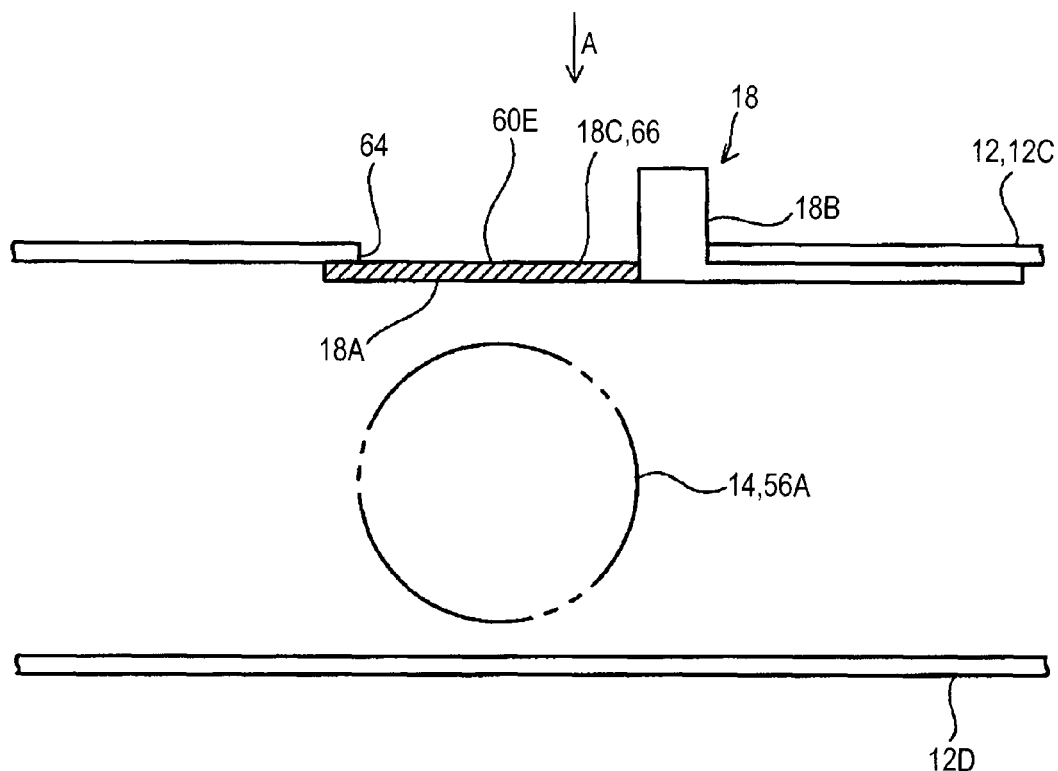
FIG. 18 is a sectional view showing the shutter operating member in a state where the shutter is located at the block position in the projector apparatus according to the fifth embodiment.
Figure 19:
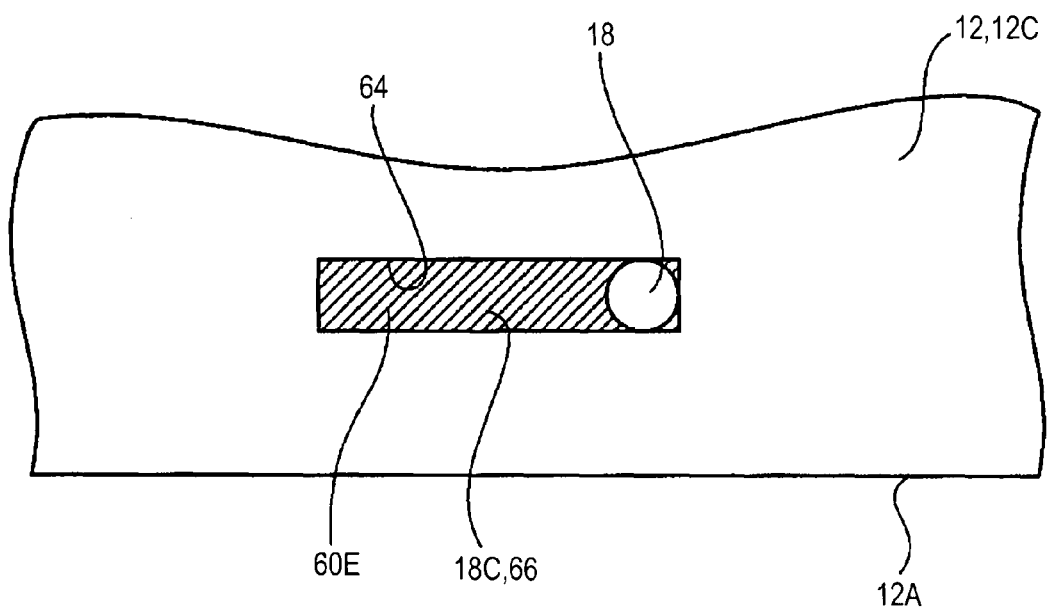
FIG. 19 is a view showing a portion indicated by the arrow A in FIG. 18.

If the shutter 16 is located at the block position as shown in FIGS. 18 and 19 when the projector apparatus 10 projects an image onto the screen 2, the projection of an image to the screen 2 is temporarily stopped.

In addition, the long hole 64 is blocked by the blocking plate portion 18C of the inside portion 18A.

Accordingly, some light beams emitted from the image projection unit 46 leak above the top wall 12C of the case 12 from the light leakage section 60E in a state where the projector apparatus 10 is operating.

As a result, also in the fourth embodiment, the same effects as in the first embodiment are obtained.

Particularly, since light leaks above the top wall 12C of the case 12, the user can see that the projector apparatus 10 is in the operating state very easily. That is, this is because an object is not placed above the projector apparatus 10 where an image is projected even if an object may be placed at the right or left side of the projector apparatus 10 or behind the projector apparatus 10.

In addition, although the case where the light leakage section 60E allows some light beams emitted from the image projection unit 46 to leak to the outside of the case 12 has been described in the fifth embodiment, it is needless to say that the light leakage section 60E may be provided to allow some light beams emitted from the light source 44 to leak to the outside of the case 12.

Moreover, instead of forming the light leakage section 60E with a translucent material, one or a plurality of through holes each of which has a sufficient diameter to transmit light therethrough may be provided in a place of the blocking plate portion 18C, such that the light leakage section 60E is formed by the through holes.

Sixth Embodiment

Next, a sixth embodiment will be described.

The sixth embodiment is different from the first to fifth embodiments in that light emitted from the image projection unit 46 is made to blink or the light is made to have a specific color at the block position of the shutter 16.

Hereinafter, the case will be described in which the sixth embodiment is applied to the configuration of the first embodiment. However, the sixth embodiment may also be applied to all configurations of the first to fifth embodiments.

Referring to FIG. 6, the projector apparatus 10 has a shutter position detector 68 which detects whether the shutter 16 is located at the open position or the block position and supplies the detection result to the control unit 42.

Various known detectors, such as a microswitch and a photo-interrupter, may be used as the shutter position detector 68.

When a situation where a warning is to be given to the user occurs, for example, the temperature in the projector apparatus 10 has risen to the abnormally high temperature while the projector apparatus 10 is operating, the control unit 42 controls the image projection unit 46 to display a warning message on the screen 2.

Such a warning display operation is effective when the shutter 16 is located at the open position, but it is difficult to display a warning message on the screen 2 when the shutter 16 is located at the block position.

Therefore, in the present embodiment, the control unit 42 performs one of the first to third warning operations, which will be described below, when the situation where a warning is to be given to the user occurs in a state where the shutter position detector 68 has detected that the shutter 16 is located at the block position.

The first warning operation is to make light emitted from the image projection unit 46 blink by controlling the image projection unit 46.

By performing the first warning operation, light leaking from the light leakage section 60A blinks. This is advantageous in that the user can notice the occurrence of abnormal situation reliably and quickly.

In this case, if the interval at which light blinks is shortened, that is, if the speed at which light blinks is increased as time passes after starting the warning operation, the user can notice the warning more easily. This is advantageous in that the user can notice the occurrence of abnormal situation reliably and quickly.

The second warning operation is to make light emitted from the image projection unit 46 have one red color by controlling the image projection unit 46.

By performing the second warning operation, red light leaks from the light leakage section 60A. This is advantageous in that the user can notice the occurrence of abnormal situation reliably and quickly.

Particularly when the input of an image signal from an external device is stopped, it is general to make light of one gray color or light of one blue color emitted from the image projection unit 46 and to display the gray or blue color on the screen 2 in order to notify the user that the input has been stopped.

Thus, since the red light which is different from the gray or blue light is emitted, the user can notice the warning more easily. This is advantageous in that the user can notice the occurrence of abnormal situation reliably and quickly.

The third warning operation is to make light emitted from the image projection unit 46 blink as one red color by controlling the image projection unit 46.

By performing the third warning operation, red light leaks from the light leakage section 60A and the red light also blinks. This is advantageous in that the user can see the occurrence of abnormal situation reliably and quickly.

In this case, if the interval at which light blinks is shortened, that is, if the speed at which light blinks is increased as time passes after starting the warning operation, the user can notice the warning more easily. This is advantageous in that the user can see the occurrence of abnormal situation reliably and quickly.

In addition, in the second and third warning operations, the color of light emitted from the image projection unit 46 is not limited to the red color. For example, it is possible to emit light of orange or yellow color which is apparently different from the gray and blue colors.

However, if the red light is adopted like the present embodiment, the user can visually notice the warning more easily. This is more advantageous in that the user can notice the occurrence of abnormal situation reliably and quickly.

In addition, any component may be used as the light leakage sections 60A to 60D as long as the component can allow some light beams emitted from the light source 44 or some light beams emitted from the image projection unit 46 to leak to the outside of the case 12. Moreover, the position, shape, and size of the light leakage section may be arbitrarily set.

The present application contains subject matter related to that disclosed in Japanese Priority Patent Application JP 2009-015232 filed in the Japan Patent Office on Jan. 27, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A projector apparatus comprising:
a case;
a light source which is provided in the case and emits light by supply of power;
an opening provided in the case;
an image projection unit that generates image projection light from light of the light source and emits the image projection light through the opening in order to project an image onto a screen;
a shutter which is moved to a block position at which the opening provided in the case is blocked or to an open position at which the opening is opened; and
a light leakage section which provides notification that the power is being supplied to the light source by allowing some light beams of the light source or some light beams of the image projection unit to leak to the outside of the case in a state where the shutter is located at the block position.

2. The projector apparatus according to claim 1,
wherein the light leakage section is formed as a gap, which is formed between an edge of the opening and the shutter, and
some light beams emitted from the image projection unit leak from the gap.

3. The projector apparatus according to claim 2,
wherein the gap is formed by a notch, which is formed in an outer peripheral portion of the shutter, and the edge of the opening, and
some light beams emitted from the image projection unit leak from the gap.

4. The projector apparatus according to claim 2,
wherein the gap is formed by a notch, which is formed at the edge of the opening, and an outer peripheral portion of the shutter, and
some light beams emitted from the image projection unit leak from the gap.

5. The projector apparatus according to claim 2,
wherein the shutter is formed to have an area smaller than the opening,
the gap is formed in a circular shape between an outer peripheral portion of the shutter and the edge of the opening at the block position, and
some light beams emitted from the image projection unit leak from the circular gap.

6. The projector apparatus according to claim 1,
wherein in an outer peripheral portion of the shutter, a through hole with a sufficient diameter to transmit light therethrough is provided at the block position, and
the light leakage section is formed by the through hole.

7. The projector apparatus according to claim 1,
wherein a through hole with a sufficient diameter to transmit light therethrough is provided in a place of the case around the opening, and
the light leakage section is formed by the through hole.

8. The projector apparatus according to claim 1,
wherein a light transmission section, which is formed of a material that transmits light therethrough, is provided in a part of the shutter,
the light leakage section is formed by the light transmission section, and
some light beams emitted from the image projection unit leak from the light transmission section.

9. The projector apparatus according to claim 1,
wherein an operating member which moves the shutter between the block position and the open position is provided in the case,
a long hole is formed in the case,
the operating member has an inside portion, which is located inside the case and is connected to the shutter, and an operating portion which protrudes from the inside portion, passes through the long hole, and protrudes to the outside of the case,
a blocking plate portion which blocks the long hole at the block position is provided in the inside portion, and
the light leakage section is provided in a place of the blocking plate portion which blocks the long hole at the block position.

10. The projector apparatus according to claim 9,
wherein a light transmission section, which is formed of a material that transmits light therethrough, is provided in a place of the blocking plate portion which blocks the long hole at the block position, and
the light leakage section is formed by the light transmission section.

11. The projector apparatus according to claim 9,
wherein a through hole with a sufficient diameter to transmit light therethrough is provided in a place of the blocking plate portion which blocks the long hole at the block position, and
the light leakage section is formed by the through hole.

12. The projector apparatus according to claim 1,
wherein light leaking from the light leakage section is a part of light emitted from the image projection unit, and
a control unit that makes the light, which is emitted from the image projection unit at the block position of the shutter, blink is provided.

13. The projector apparatus according to claim 1,
wherein light leaking from the light leakage section is a part of light emitted from the image projection unit, and
a control unit that makes the light, which is emitted from the image projection unit at the block position of the shutter, have one red color is provided.

14. The projector apparatus according to claim 1,
wherein light leaking from the light leakage section is a part of light emitted from the image projection unit, and
a control unit that makes the light, which is emitted from the image projection unit at the block position of the shutter, blink as one red color is provided.

15. The projector apparatus according to claim 1,
wherein the case has a front surface formed with the opening and a top surface facing upward, and
the light leaks frontward from a place of the front surface of the case or upward from a place of the top surface.

* * * * *